United States Patent
Archibald, Jr. et al.

(10) Patent No.: US 6,973,553 B1
(45) Date of Patent: Dec. 6, 2005

(54) METHOD AND APPARATUS FOR USING EXTENDED DISK SECTOR FORMATTING TO ASSIST IN BACKUP AND HIERARCHICAL STORAGE MANAGEMENT

(75) Inventors: John Edward Archibald, Jr., Boulder, CO (US); Brian Dennis McKean, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 09/692,957

(22) Filed: Oct. 20, 2000

(51) Int. Cl.⁷ .......................................... G06F 13/00
(52) U.S. Cl. .................. 711/162; 711/100; 711/112
(58) Field of Search ..................... 711/100, 112, 114, 711/161, 162; 360/47, 48, 72.1

(56) References Cited

U.S. PATENT DOCUMENTS

| | | | |
|---|---|---|---|
| 3,725,864 A | | 4/1973 | Clark et al. |
| 4,092,732 A | | 5/1978 | Ouchi |
| 5,050,013 A | * | 9/1991 | Holsinger .................. 360/72.1 |
| 5,070,474 A | * | 12/1991 | Tuma et al. .................. 703/24 |
| 5,265,230 A | * | 11/1993 | Saldanha et al. ........... 711/161 |
| 5,412,661 A | | 5/1995 | Hao et al. |
| 5,696,933 A | | 12/1997 | Itoh et al. |
| 5,740,358 A | | 4/1998 | Geldman et al. |
| 5,745,313 A | * | 4/1998 | Sliger .......................... 360/48 |
| 5,812,755 A | | 9/1998 | Kool et al. |
| 5,829,011 A | * | 10/1998 | Glover ....................... 711/100 |
| 5,857,208 A | * | 1/1999 | Ofek .......................... 707/204 |
| 5,907,672 A | * | 5/1999 | Matze et al. .................... 714/8 |
| 5,941,994 A | * | 8/1999 | DeKoning et al. ............. 714/7 |
| 6,009,537 A | * | 12/1999 | Tanimoto et al. .............. 714/8 |
| 6,023,383 A | * | 2/2000 | Glover et al. ................. 360/46 |
| 6,140,926 A | * | 10/2000 | Hayden et al. ............. 340/635 |
| 6,175,549 B1 | * | 1/2001 | Takagi et al. ............ 369/275.3 |
| 6,397,229 B1 | * | 5/2002 | Menon et al. .............. 707/204 |
| 6,397,351 B1 | * | 5/2002 | Miller et al. .................. 714/13 |
| 6,412,080 B1 | * | 6/2002 | Fleming et al. ............... 714/15 |
| 6,430,611 B1 | * | 8/2002 | Kita et al. .................. 709/223 |
| 6,442,551 B1 | * | 8/2002 | Ofek .......................... 707/10 |

FOREIGN PATENT DOCUMENTS

| | | |
|---|---|---|
| WO | WO 99/23562 | 10/1998 |
| WO | WO 99/63441 | 6/1999 |

OTHER PUBLICATIONS

"Enhanced RAID-5 Error Recovery in Response to Drive Hard Read Errors," IBM Technical Bulletin Disclosure, Article 41188, Jul. 1998, pp. 964, 965.

* cited by examiner

Primary Examiner—Tuan V. Thai
(74) Attorney, Agent, or Firm—Chambliss, Bahner & Stophel, P.C.

(57) ABSTRACT

A method and apparatus for providing extended disk sector formatting to assist in backup and hierarchical storage management is disclosed. A part of the extended sector format is used to include a field for indicating whether data was written since the last backup. This backup field may be a single bit or could be larger to indicate age since last backup.

7 Claims, 6 Drawing Sheets

METHOD AND APPARATUS FOR USING EXTENDED DISK SECTOR FORMATTING TO ASSIST IN BACKUP AND HIERARCHICAL STORAGE MANAGEMENT

BACKGROUND OF THE INVENTION

1. Field of the Invention

This invention relates in general to mass storage systems, and more particularly to a method and apparatus for using extended disk sector formatting to assist in backup and hierarchical storage management.

2. Description of Related Art

Much of the voluminous amount of information stored, communicated, and manipulated by modern computer systems is duplicated within the same or a related computer system. It is commonplace, for example, for computers to store many slightly differing versions of the same document. It is also commonplace for data transmitted during a backup operation to be almost identical to the data transmitted during the previous backup operation. Computer networks also must repeatedly carry the same or similar data in accordance the requirements of their users.

One problem that arises in connection with backing up information is that generally, during the backup operation, the mass storage subsystem from which information is being backed up is generally unavailable for the duration of the backup operation. This is generally necessary since typically it is desired to have the backup reflect the state of the information stored on the mass storage subsystem at a particular point in time, such as at the beginning of the backup operation, so that the backup will provide a "snapshot" of the information at that point in time.

Known computer backup methods copy files from one storage system to a different storage system. In a full backup, all files of the disk are copied, often requiring that all users be locked out until the process completes. In an "incremental backup," only those files that have changed since the previous backup, are copied.

If a file is corrupted, or the storage system or its host computer fails, the last version of the file that was backed-up can be restored by mounting the backup and copying the backup copy over the corrupted copy or to a good storage system. Data can also be protected against failure of its storage device by "disk mirroring," in which data are stored redundantly on two or more disks.

In hierarchical storage systems, intensively-used and frequently-accessed data are stored in fast but expensive memory, and less-frequently-accessed data are stored in less-expensive but slower memory. A typical hierarchical storage system might have several levels of progressively-slower and -cheaper memories, including processor registers, cache memory, main storage (RAM), disk, and off-line tape storage.

Conventional computer file backup techniques allow incremental backup of a file using a time stamp associated with the file. As a result of such backup techniques, different versions of a file may be stored in the memory of a backup media. The capacity of the backup media is generally not overburdened when the size of a file being stored on the media is small. However, when the size of a file and each version thereof is very large, or the file is a disc partition, then the capacity of the backup media may be used up quickly. This problem is especially true when the difference between two versions of a large file, or disc partition, is not great, since it results in storing in the backup media two slightly different versions of the same file each of which is very large.

When a backup occurs from on a host computer system the host usually marks metadata about each file to indicate which files have been backed up. This allows the host to do an incremental backup for each subsequent backup process. When an array controller manages a backup application, such as snapshot backup, it has no effective way of knowing which sectors have been updated by the host in order to perform an incremental backup on subsequent passes.

However, if the array controller implements a physical disk format larger than the host data format, the controller has the ability to store additional information along with each sector of host data. A typical use of this extra sector data is to store a Longitudinal Redundancy Check (LRC) of the user data within the sector. Another known use of this extra data within the sector is to store the logical block address of the sector to aid detection of data mishandling. The user data typically is stored in 512 byte blocks. The drives can be formatted in varying sector sizes, depending on the manufacturer and model. Typical values for available formatted sector size are 512, 520, 524, and 528 bytes.

It can be seen then that there is a need for a method and apparatus that uses a part of the extended sector format to include a field to indicate that the data was written since the last backup.

SUMMARY OF THE INVENTION

To overcome the limitations in the prior art described above, and to overcome other limitations that will become apparent upon reading and understanding the present specification, the present invention discloses a method and apparatus for providing extended disk sector formatting to assist in backup and hierarchical storage management.

The present invention solves the above-described problems by using a part of the extended sector format to include a field to indicate that the data was written since the last backup. This backup field could be a single bit or could be larger to indicate age since last backup. Of course, the present invention assumes that the physical disks have been formatted with the extended sector format so that the extra field can be included to provide the backup indicator.

A data recording media in accordance with the principles of the present invention includes a plurality of extended format sectors, the extended format sectors comprising a user data sector field for storing user data and a backup indicator field for indicating the status of the user data sector field.

Other embodiments of a system in accordance with the principles of the invention may include alternative or optional additional aspects. One such aspect of the present invention is that the backup indicator field indicates whether the user data in the user data sector field has been written to backup storage subsequent to a previous backup operation.

Another aspect of the present invention is that the backup indicator comprises a single bit.

Another aspect of the present invention is that the backup indicator comprises an indicator of whether the user data in the user data sector field has been written to backup storage subsequent to a previous backup operation and data indicating the age of the user data in the user data sector field.

Another aspect of the present invention is that the backup indicator indicates whether the user data sector field has been written to.

In another embodiment of the present invention, a data storage system is provided. The data storage system includes a magnetic storage medium having servo information recorded on servo tracks interspersed between a plurality of extended format sectors, a motor for moving the magnetic storage medium relative to a magnetic head assembly, and a head assembly having at least one read head for reading and writing data on the a plurality of extended format sectors, wherein the extended format sectors further comprises a user data sector field for storing user data and a backup indicator field for indicating the status of the user data sector field.

Another aspect of the present invention is that the backup indicator field indicates whether the user data in the user data sector field has been written to backup storage subsequent to a previous backup operation.

Another aspect of the data storage system is that the backup indicator comprises a single bit.

Another aspect of the data storage system is that the backup indicator comprises an indicator of whether the user data in the user data sector field has been written to backup storage subsequent to a previous backup operation and data indicating the age of the user data in the user data sector field.

Another aspect of the data storage system is that the backup indicator indicates whether the user data sector field has been written to.

In another embodiment of the present invention, a data storage system is provided that includes a host computer system, a first set of storage volumes, a second set of storage volumes for backing-up data from the first set of storage volumes and a controller for controlling the transfer of data from the host system to the first and second set of storage volumes, wherein at least the first set of storage volumes further comprises data recording media including a plurality of extended format sectors, the extended format sectors comprising a user data sector field for storing user data and a backup indicator field for indicating the status of the user data sector field.

Another aspect of the data storage system is that the backup indicator field indicates whether the user data in the user data sector field has been written to backup storage subsequent to a previous backup operation.

Another aspect of the data storage system is that the backup indicator comprises a single bit.

Another aspect of the data storage system is that the backup indicator comprises an indicator of whether the user data in the user data sector field has been written to backup storage subsequent to a previous backup operation and data indicating the age of the user data in the user data sector field.

Another aspect of the data storage system is that the backup indicator indicates whether the user data sector field has been written to.

Another aspect of the data storage system is that the first set of storage volumes is arranged as a virtual space wherein the host views the configuration as being a storage device having a first predetermined size and the controller allocates storage space from the first set of storage volumes having a physically smaller size than viewed by the host.

Another aspect of the data storage system is that the controller periodically determines which sectors have been written using the backup indicator to predict when the host will need additional physical space.

Another aspect of the data storage system is that the controller allocates additional storage space on the first set of storage volumes before the host requires additional storage space to minimize delays to the host.

Another aspect of the data storage system is that the controller reads the backup indicator to determine when a usage threshold have been exceeded.

In another embodiment of the present invention, a method for tracking the status of writes to areas of a storage device is provided. The method includes: a) initializing a storage system and clearing a backup indicator field in an extended format sector used for indicating the status of a user data sector field of the extended format sector, b) setting the backup indicator when a host writes to a user data sector field and c) reading every sector included in a host user area of the system drive and backing-up only user data sector field in the extended format sectors having the backup indicator field set.

Another aspect of the present invention is that the method further includes d) clearing the backup indicator field after the user data sector field has been backed-up.

Another aspect of the present invention is that the method further includes repeating b)–d) for each subsequent backup.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing extended disk sector formatting to assist in backup and hierarchical storage management. The present invention solves the above-described problems by using a part of the extended sector format to include a field to indicate that the data was written since the last backup. This backup field could be a single bit or could be larger to indicate age since last backup. Of course, the present invention assumes that the physical disks have been formatted with the extended sector format so that the extra field can be included to provide the backup indicator.

Figure 1:
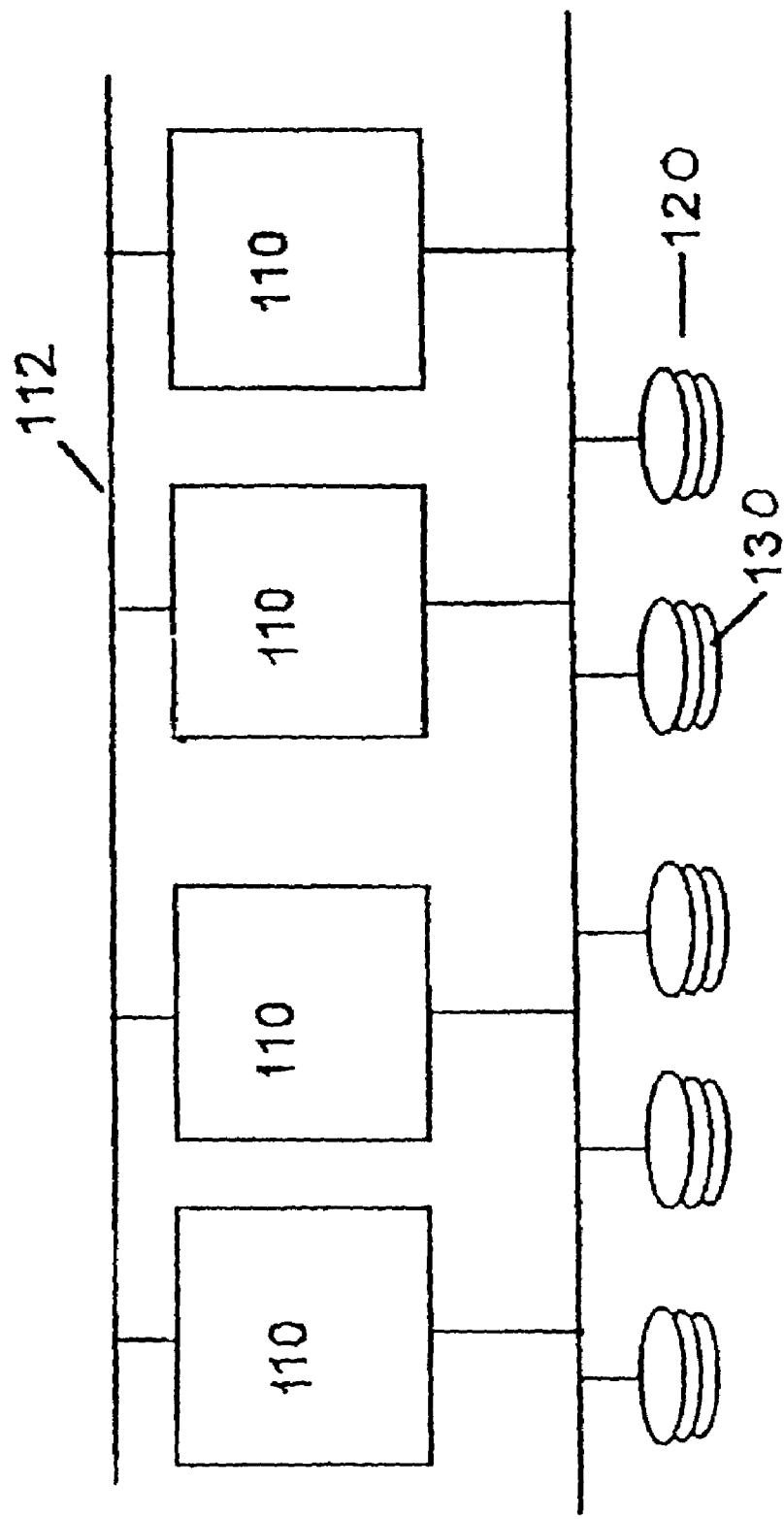
FIG. 1 illustrates a typical distributed data processing system 100 with which the invention is concerned.

FIG. 1 illustrates a typical distributed data processing system 100 with which the invention is concerned. The system may include a plurality of processing nodes 110, an inter-connecting network 112 and shared data storage 130, illustrated as a shared disk subsystem 120. Each disk 130 of subsystem 120 can be accessed from each of the nodes 110. Those skilled in the art will recognize, however, that the present invention is not meant to be limited to a distributed data processing system. The implementation of the present invention can just as easily be implemented in a system that comprises a single host processing system with an attached data storage system.

Figure 2:
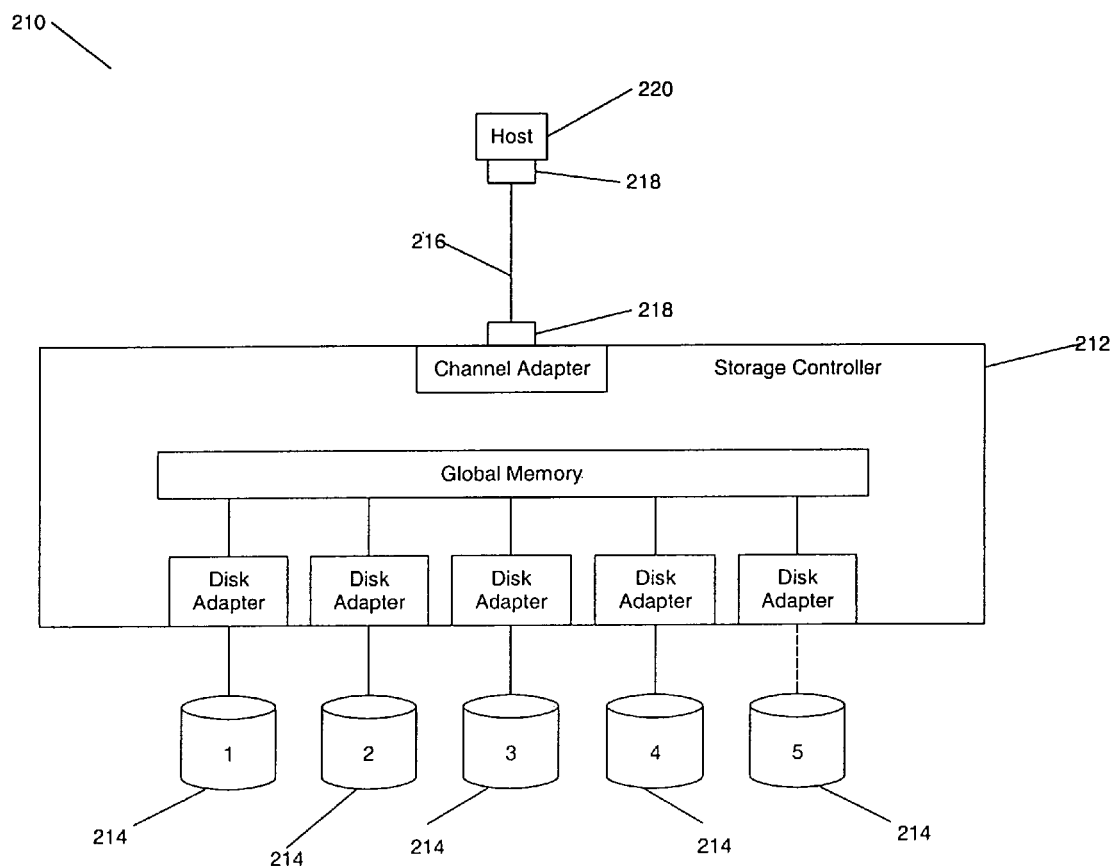
FIG. 2 illustrates a storage system for a typical mass storage configuration having a storage controller connecting to a plurality of storage elements.

FIG. 2 illustrates a storage system 210 for a typical mass storage configuration having a storage controller 212 connecting to a plurality of storage elements 214. The storage elements are collectively controlled by the storage controller, and may be of any size, however for certain configurations it is preferred that the drives be of a similar size. The storage elements 214 are arranged to form at least a first and second set of storage volumes, wherein the second set of storage volumes are used for backing-up data from the first set of storage volumes. Those skilled in the art will recognize that the storage elements may be an array of disk drives, optical storage devices, tape drives, or any desired combination. Further, those skilled in the art will readily recognize that the present invention may be implemented with any type of storage element having extended formatting as will be described in more detail herein below.

The storage controller 212 connects over a communications path 216, connected through terminator elements 218, to a host computer 220. The communications path can be for example a SCSI bus and the host computer 220 can be a server, a main frame computer, or a work station having a display and keyboard.

The storage elements 214, while being characterized as having a so-called capacity in terms of the number of bytes each can store, are divided both physically and logically into a plurality of elements. Logically, these elements, called logical volumes, may be split by the storage controller 212 across a number of storage elements 214, as is used in some forms of RAID, or one or more logical volumes can be found on a single storage element 214. The interconnection and access which a host has to a logical volume is set by the storage controller 212.

As noted above, different host computers, depending upon their manufacturer, operate in accordance with different protocols. In particular, when writing to a mass storage device, the host computer will block the data, however, the size of the blocks may vary depending upon both the particular protocol being used and the manufacturer. For example, an IBM based system such as the AS/400 will block the data into blocks of 520 bytes.

Figure 3:
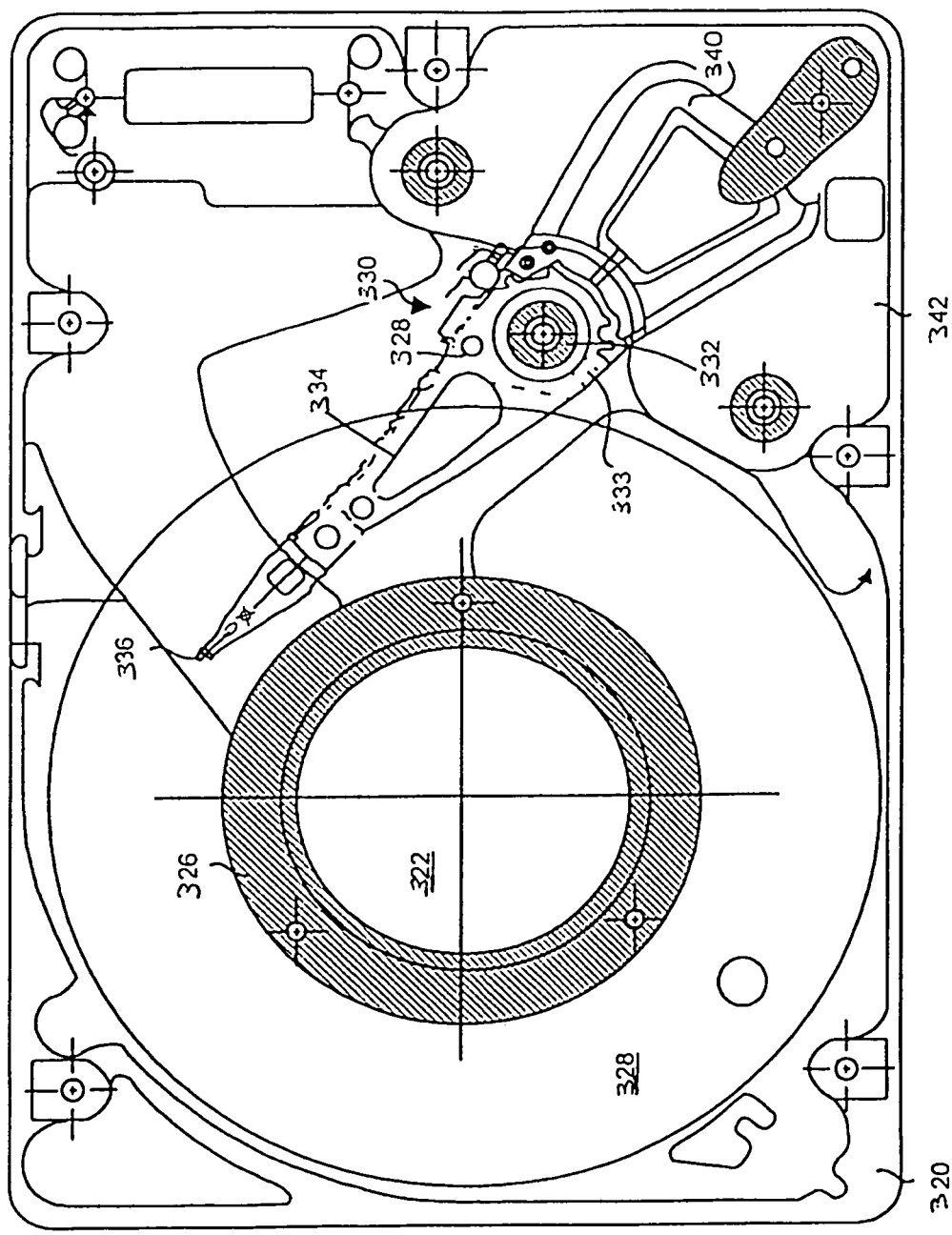
FIG. 3 illustrates the principal electrical and mechanical components of a disk drive.

Referring to FIG. 3, the principal electrical and mechanical components of one type of storage element, i.e., a disk drive, are illustrated. The disk drive includes a head/disk assembly (HDA) 320 which includes a base 322 and a cover (not shown). Attached to the base 322 is a spindle with an attached hub 326. Attached to the spindle with an attached hub 326 is at least one disk 328. Also attached to the base is a spindle motor for rotating the spindle with an attached hub 326 and the disk 328. Spindle motor driver circuitry controls the current passing through the spindle motor to produce a torque and controllably rotate the hub and disk 328 attached to the spindle.

An actuator assembly 330 is also attached to the base 322. The actuator assembly 330 shown is a rotary type actuator and is provided with a pivot apparatus 332, such as a bearing cartridge, to allow smooth rotation of the actuator assembly. The actuator assembly 330 includes a body 333 having arms 334 on one end. The arms 334 carry transducers 336 in transducing relation to the disk 328. A load beam or suspension 335 is attached to each arm. The transducers 336 are attached to each load beam or suspension 335. The transducers 336 are encapsulated within a slider or small ceramic block. The slider carries the transducer over the disk. The other end of the actuator body 333 includes a portion of an actuator motor. The portion of the actuator motor shown attached to the actuator body 333 is the coil 340. An other portion of the actuator motor is attached to the base 322. The other portion shown in FIG. 3 is a magnetic field apparatus 342. The coil 340 and the magnetic field apparatus 342 form a voice coil motor used to move the actuator body and reposition one or more sliders which carry the transducers 336, also commonly referred to as read/write heads, to different radial positions relative to one or more surfaces of the disk 328. The pivot apparatus 332, such as a precision bearing cartridge, allows for a smooth rotational movement of the actuator assembly 330.

Figure 4:
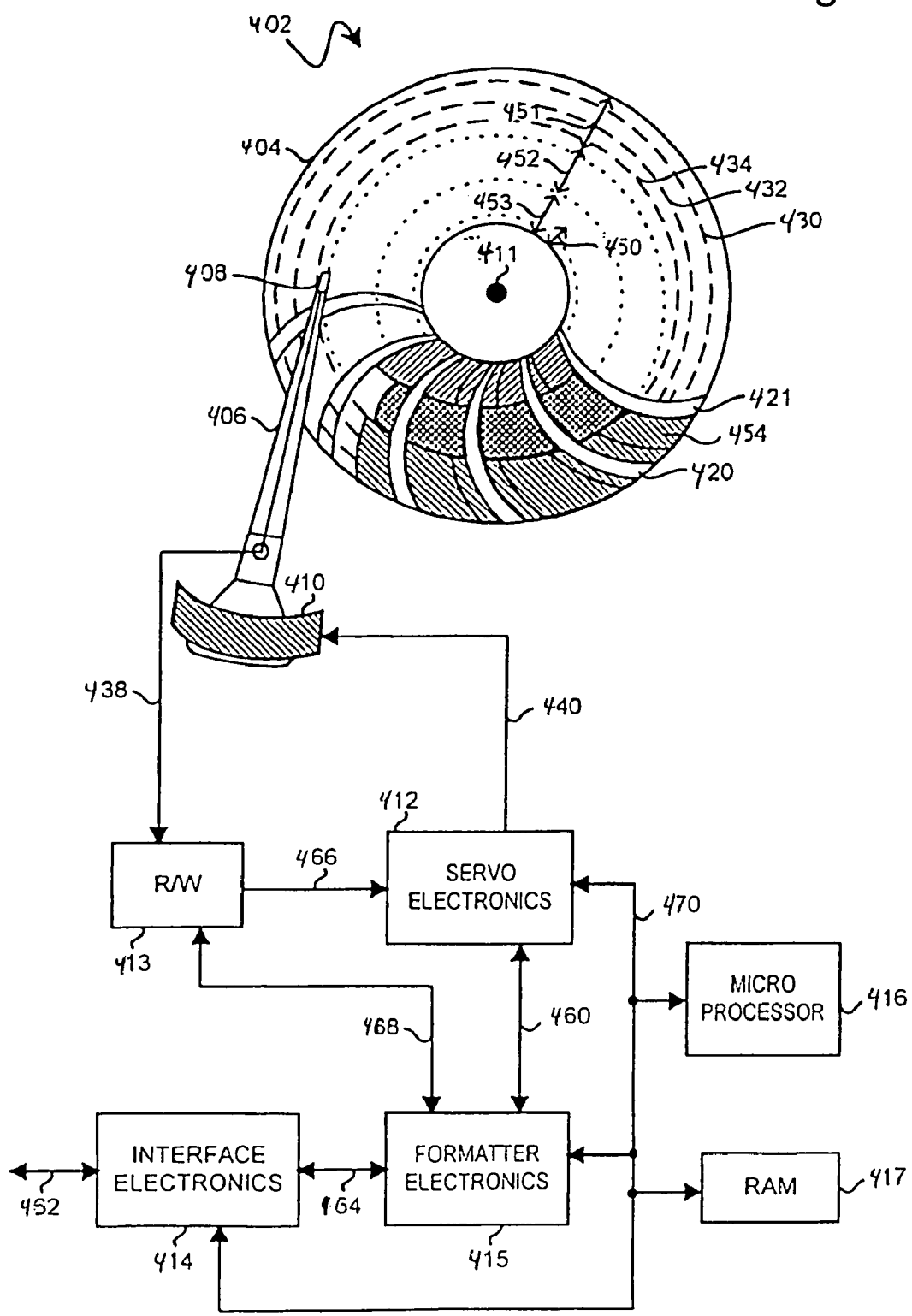
FIG. 4 illustrates the formatting of a disk drive according to the present invention.

FIG. 4 illustrates the formatting of a disk drive according to the present invention. As shown in FIG. 4, the disk drive is formatted using a fixed block architecture with sector servo and zone-bit recording. However, those skilled in the art will recognize that the present invention is not meant to be limited to the specific formatting illustrated in FIG. 4. Rather, the formatting is presented as one example of formatting of a disk drive for better understanding of extended formatting. The disk drive, designated generally as 402, includes data recording disk 404, actuator arm 406, data recording transducer 408 (also called a recording head), voice coil motor 410, servo electronics 412, read/write electronics 413, interface electronics 414, formatter electronics 415, microprocessor 416 and RAM 417. Data recording disk 404 includes center of rotation 411, and is divided for head positioning purposes into a set of radially spaced tracks, one of which is shown at 418. The tracks are grouped radially into a number of zones, four of which are shown as 450, 451, 452 and 453. Zone 450 is a reserve area zone where certain critical information such as tables and indices needed to convert logical block addresses to physical locations, are stored.

The tracks are also grouped radially into a plurality of sparing partitions, three of which are shown as 430, 432, and 434. Each sparing partition includes a selected number of tracks and includes a number of desired spare sectors. As shown, the sparing partitions are groups of tracks which are smaller than the zones 451, 452 and 453 in which customer data is stored. It should be noted, that this does not necessarily have to be the case. The sparing partitions could be larger than the zones if so desired. The sparing partitions contain a selected number of spare sectors within each sparing partition. The sparing partitions are generally invisible and therefore the boundaries are shown as dashed lines.

The disk contains a plurality of servo sectors 420, which extend across the tracks in a generally radial direction. Each track has a reference index 421. Within each zone, the tracks are also circumferentially divided into a number of data sectors 454. As will be discussed hereafter, the data sectors contain no sector ID fields. In accordance with the normal meaning of "fixed block architecture", all data sectors are substantially the same size, expressed in bytes of data. The number of data sectors per track varies from zone to zone, and some of the data sectors do not begin immediately following a servo sector. Further, some of the data sectors are split by servo sectors. If the disk drive has multiple heads, then the set of tracks which are at the same radius on all surfaces is referred to as a "cylinder".

Read/write electronics 413 receives signals from transducer 408, passes servo information to servo electronics 412, and passes data signals to formatter 415. Servo electronics 412 uses the servo information to produce a current at 440 which controls the voice coil motor 410 to properly position the transducer 408. Interface electronics 414 communicates with a host system (not shown) over interface 462, passing data and command information. Interface electronics 414 also communicates with formatter 415 over interface 464. Microprocessor 416 communicates with the various other electronics over command and data bus 470.

In the operation of disk drive 402, interface electronics 414 receives a request for reading or writing data sectors over interface 462. Formatter electronics 415 receives a list of requested data sectors from interface electronics 414 and converts them into zone, cylinder, head and data sector numbers which uniquely identify the location of the desired data sectors. The head and cylinder information are passed to servo electronics 412, which is responsible for positioning recording head 408 over the appropriate data sector on the appropriate cylinder. If the cylinder number provided to servo electronics 412 is not the same as the track number over which recording head 408 is presently positioned, a seek operation is performed to reposition recording head 408 over the appropriate cylinder.

Once servo electronics 412 has positioned recording head 408 over the appropriate track, servo electronics 412 begins executing sector computations in order to locate and identify the desired data sector. As servo sectors 420 pass under recording head 408, the index mark 421 identifies the first servo sector, a wedge number locates and uniquely identifies subsequent servo sectors. In the format used in the present invention, the field holding the wedge number at a first wedge contains a head number in the next servo sector. The head number and the wedge number are alternated. A count of wedge numbers/head number field can also be used to identify each servo sector.

Additional information, which is described in greater detail below, is maintained in association with servo electronics 412 and formatter electronics 415 and is used to determine whether the present servo sector splits a data sector or whether a new data sector starts immediately following the present servo sector. Further information is maintained in servo electronics 412 and formatter electronics 415 which identifies the location of (or the distance to) the start of the next data sector from the present servo sector. Still further information is maintained which identifies the location of (or the distance to) any additional data sectors which begin before the next subsequent servo sector. Still further information identifies the number of the data sectors from the index mark 421. Other information determines the locations of the track and track offsets in the case of a bad or defective track. This information is used to allow formatter electronics 415 to compare the data sector number passing under the recording head with the list of sectors received from interface electronics 414.

Figure 5:
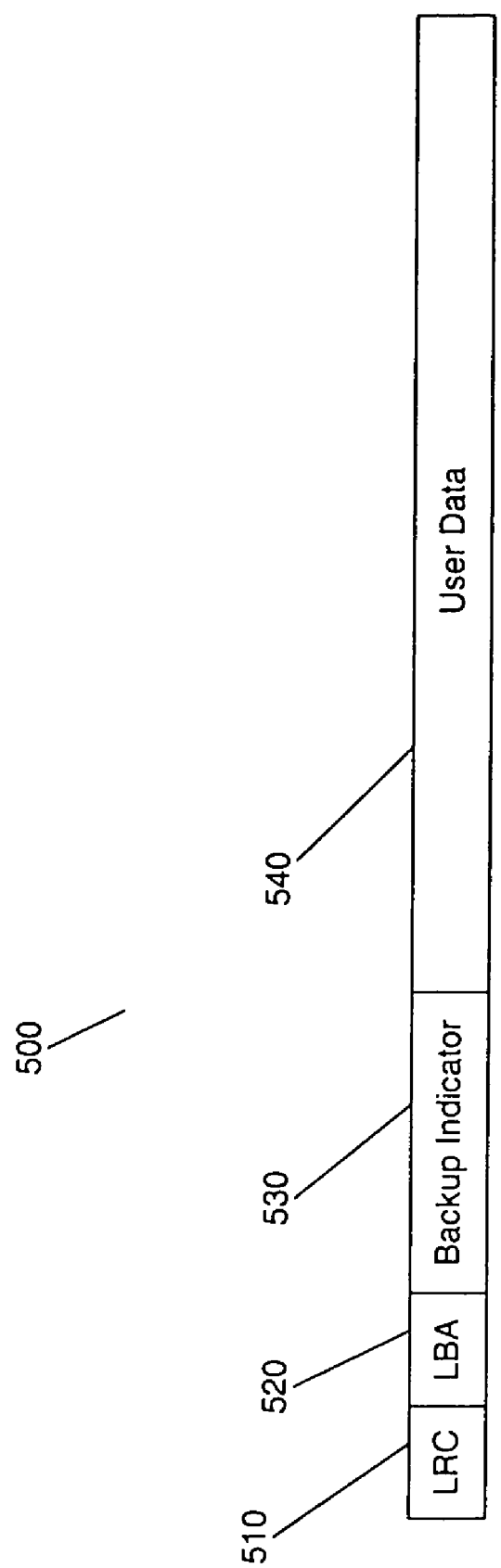
FIG. 5 illustrates an extended sector according to the present invention.

FIG. 5 illustrates an extended sector 500 according to the present invention. As illustrated in FIG. 5, the extended sector may contain a Longitudinal Redundancy Check 510 (LRC) of the user data within the sector and extra data within the sector to store the logical block address 520 of the sector to aid detection of data mishandling. The user data 540 typically is stored in 512 byte blocks. The overall sector size for an extended sector are 520, 524, and 528 bytes. Finally, according to the present invention, a part of the extended sector format includes a field 530 to indicate that the data was written since the last backup. This backup field 530 could be a single bit or could be larger to indicate age since last backup.

Figure 6:
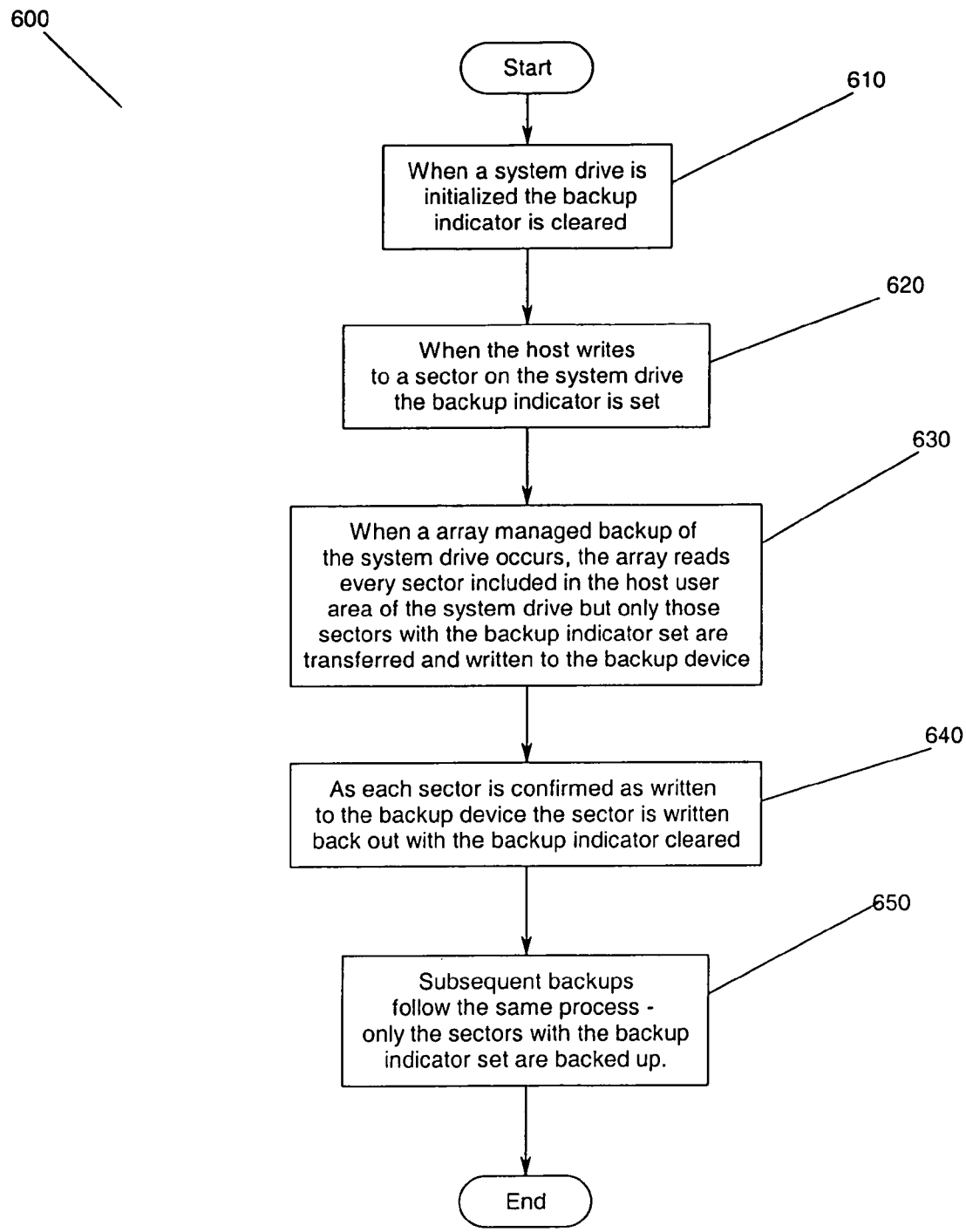
FIG. 6 illustrates a flow chart of the present invention.

FIG. 6 illustrates a flow chart 600 of the present invention. When a system drive is initialized the backup indicator is cleared 610. When the host writes to a sector on the system drive the backup indicator is set 620. When a array managed backup of the system drive occurs, the array reads every sector included in the host user area of the system drive but only those sectors with the backup indicator set need to be transferred and written to the backup device 630. As each sector is confirmed as written to the backup device the sector is written back out with the backup indicator cleared 640. Subsequent backups follow the same process—only the sectors with the backup indicator set need to be backed up 650.

Referring to FIGS. 2 and 5, the primary benefit of this invention is to allow the array controller 212 to save time during an array managed backup by using an incremental backup. If the array controller 212 implements a physical sector format larger than the host data format, the controller 212 has the ability to store additional information, e.g., LRC 510, LBA 520, as well as the backup indicator 530 and each sector of host data 540. The added backup indicator field 530 thus can be used to indicate that a sector has been written to by the host 220. The field 530 is cleared when the system is initialized. The field 530 is then set when written by the host 220. Thus, the array controller 212 can scan the sectors of the system to determine which sectors indicate that they have been written.

With known array managed backup strategies, the array methods have no way of knowing which sectors in the system drive have or have not been written to by the host 220. With existing methods, a full backup must backup every sector in the system drive. However, by using a field 530 to indicate which sectors have been written, the array controller 212 can perform a full backup on only those sectors that have been written to by the host 220. Further, without knowledge of which sectors have been written by the host 220, it is more difficult implement virtual storage management for a system. Virtual storage management is a technique for allowing a host 220 to configure a system drive of some size while the array controller 212 allocates a physically smaller space as the host 220 uses up the allocated space the array controller 212 can enlarge the physical space assigned to the virtual system drive. The use of the written field indicator 530 can enhance an array controller's ability to manage a virtual space on a storage system. The array controller 212 periodically scans the allocated host 220 areas and uses the information about which sectors have been written to predict when the host 220 will need additional physical space. The physical space can be allocated before the host 220 requires it to minimize delays in host 220 I/O for allocation on the fly. The array controller 212 cannot assist a system administrator with space management unless the controller 212 knows what areas have been written. If the array controller 212 can scan for written sectors by analyzing the backup indicator fields 530, the system administrator may be alerted when storage system usage thresholds have been exceeded.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data storage system, comprising:
   a host computer system;
   a first set of storage volumes;
   a second set of storage volumes for backing-up data from the first set of storage volumes; and
   a controller for controlling the transfer of data from the host system to the first and second set of storage volumes, wherein at least the first set of storage volumes further comprises data recording media including a plurality of extended format sectors, the extended format sectors comprising a user data sector field for storing user data and a backup indicator field for indicating the status of the user data sector field;
   wherein the backup indicator field indicates whether the user data in the user data sector field has been written to backup storage subsequent to a previous backup operation and wherein the first set of storage volumes is arranged as a virtual space wherein the host views the configuration as being a storage device having a first predetermined size and the controller allocates storage space from the first set of storage volumes having a physically smaller size than viewed by the host.

2. The data storage system of claim 1 wherein the backup indicator comprises a single bit.

3. The data storage system of claim 1 wherein the backup indicator comprises an indicator of whether the user data in the user data sector field has been written to backup storage subsequent to a previous backup operation and data indicating the age of the user data in the user data sector field.

4. The data storage system of claim 1 wherein the backup indicator indicates whether the user data sector field has been written to.

5. The data storage system of claim 1 wherein the controller periodically determines which sectors have been written using the backup indicator to predict when the host will need additional physical space.

6. The data storage system of claim 1 wherein the controller allocates additional storage space on the first set of storage volumes before the host requires additional storage space to minimize delays to the host.

7. The data storage system of claim 6 wherein the controller reads the backup indicator to determine when a usage threshold have been exceeded.

* * * * *